United States Patent
Bedingfield et al.

(10) Patent No.: US 11,226,463 B2
(45) Date of Patent: Jan. 18, 2022

(54) MULTIPLE CHAMBER FOLDED INNERDUCT STRUCTURE

(71) Applicant: Milliken & Company, Spartanburg, SC (US)

(72) Inventors: Steven L. Bedingfield, LaGrange, GA (US); Kwee C. Lee, Singapore (SG); Kai Chen, Shanghai (CN)

(73) Assignee: Milliken & Company, Spartanburg, SC (US)

( * ) Notice: Subject to any disclaimer, the term of this patent is extended or adjusted under 35 U.S.C. 154(b) by 8 days.

(21) Appl. No.: 16/674,458

(22) Filed: Nov. 5, 2019

(65) Prior Publication Data

US 2020/0199793 A1    Jun. 25, 2020

Related U.S. Application Data

(60) Provisional application No. 62/782,437, filed on Dec. 20, 2018.

(51) Int. Cl.
*H02G 3/04* (2006.01)
*D03D 1/00* (2006.01)
(Continued)

(52) U.S. Cl.
CPC .............. *G02B 6/4459* (2013.01); *B32B 1/06* (2013.01); *B32B 3/02* (2013.01); *B32B 5/024* (2013.01);
(Continued)

(58) Field of Classification Search
CPC ...... H02G 3/0406; H02G 3/0437; H02G 3/04; H02G 3/0487; G02B 6/4459; G02B 6/50; G02B 6/46; G02B 6/54
See application file for complete search history.

(56) References Cited

U.S. PATENT DOCUMENTS

| | | | |
|---|---|---|---|
| 3,911,200 A | 10/1975 | Simons et al. | 174/36 |
| 4,281,211 A | 7/1981 | Tatum et al. | 174/36 |

(Continued)

FOREIGN PATENT DOCUMENTS

| | | |
|---|---|---|
| DE | 20201504 | 5/2002 |
| DE | 102 04 019 | 8/2003 |

(Continued)

OTHER PUBLICATIONS

Patent Cooperation Treaty PCT International Search Report, dated Feb. 24, 2020. International Application No. PCT/US2019/060057. International Filing Date: Nov. 6, 2019.

*Primary Examiner* — Hoa C Nguyen
*Assistant Examiner* — Amol H Patel
(74) *Attorney, Agent, or Firm* — Cheryl Brickey

(57) ABSTRACT

A flexible innerduct structure having a first margin region, a second margin region, and a middle region, where the middle region is located between the first and second margin regions. The innerduct structure contains at least two flexible, longitudinal chambers, with each chamber being designed for enveloping at least one cable.

The flexible innerduct structure contains at least one strip-shaped textile, each strip containing a first side and a second edge and extending in the longitudinal direction. All first and second edges of the strips are located in the middle region and each strip-shaped textile extends outwards from the middle region, folds about a fold axis located in either the first or second margin region and returns to the middle region. At least one strip extends from the first to the second margin region and the strips are attached together in the middle region.

21 Claims, 4 Drawing Sheets

(51) Int. Cl.
  *G02B 6/44* (2006.01)
  *B32B 1/06* (2006.01)
  *D03D 3/00* (2006.01)
  *D03D 13/00* (2006.01)
  *D03D 15/46* (2021.01)
  *D03D 15/292* (2021.01)
  *D03D 11/02* (2006.01)
  *B32B 3/02* (2006.01)
  *B32B 5/02* (2006.01)

(52) U.S. Cl.
  CPC .......... *D03D 1/0043* (2021.05); *D03D 3/005* (2013.01); *D03D 11/02* (2013.01); *D03D 13/004* (2013.01); *D03D 15/292* (2021.01); *D03D 15/46* (2021.01); *H02G 3/0406* (2013.01); *H02G 3/0487* (2013.01); *D10B 2403/03* (2013.01); *H02G 3/0462* (2013.01)

(56) References Cited

U.S. PATENT DOCUMENTS

| | | | | |
|---|---|---|---|---|
| 4,582,093 | A | 4/1986 | Hubbard | 138/111 |
| 4,602,763 | A | 7/1986 | Gaylin | 254/134.3 FT |
| 4,761,194 | A | 8/1988 | Pithouse et al. | 156/86 |
| 4,862,922 | A | 9/1989 | Kite, III | 138/119 |
| 4,929,478 | A | 5/1990 | Conaghan et al. | 428/35.1 |
| 5,016,859 | A | 5/1991 | Zimmer et al. | 254/134 R |
| 5,027,864 | A | 7/1991 | Conti | 138/177 |
| 5,442,136 | A | 8/1995 | Allen | 174/95 |
| 5,513,123 | A | 4/1996 | Salmi et al. | |
| 5,587,115 | A | 12/1996 | Allen | 264/124 |
| 5,789,711 | A | 8/1998 | Gaeris et al. | 174/113 C |
| 5,843,542 | A | 12/1998 | Brushafer | 428/36.1 |
| 5,969,295 | A | 10/1999 | Boucino et al. | 174/113 C |
| 6,178,278 | B1 | 1/2001 | Keller et al. | 385/109 |
| 6,251,201 | B1 | 6/2001 | Allen | 156/47 |
| 6,262,371 | B1 | 7/2001 | Allen | 174/68.1 |
| 6,304,698 | B1 | 10/2001 | Morris | 385/100 |
| 6,398,190 | B1 | 6/2002 | Li | 254/134.4 |
| 6,421,485 | B2 | 7/2002 | Morris | 385/100 |
| 6,471,440 | B1 | 10/2002 | Scheiwiller | 404/39 |
| 6,571,833 | B1 | 6/2003 | McLarty, III et al. | 138/116 |
| 6,718,100 | B2 | 4/2004 | Morris | 385/100 |
| 6,876,797 | B2 | 4/2005 | Morris | 385/100 |
| 6,886,601 | B2 | 5/2005 | Allen | 138/107 |
| 6,963,031 | B2 | 11/2005 | Gladfelter | 174/74 A |
| 7,078,615 | B2 | 7/2006 | Gladfelter | 174/361 |
| 7,085,455 | B2 | 8/2006 | Morris | 385/100 |
| 7,085,458 | B2 | 8/2006 | Morris | 385/110 |
| 7,174,074 | B2 | 2/2007 | Morris | 385/100 |
| 7,319,802 | B2 | 1/2008 | Morris | 385/109 |
| 7,621,505 | B2 | 11/2009 | Hamrick | 254/134.3 FT |
| 7,754,971 | B2 | 7/2010 | Bedingfield et al. | 174/117 |
| 7,799,997 | B2 | 9/2010 | Bedingfield et al. | 174/93 |
| 8,387,954 | B2 | 3/2013 | Allen | 254/134 |
| 8,809,682 | B2 | 8/2014 | Hepfinger et al. | 174/95 |
| 10,435,824 | B2 | 10/2019 | Bedingfield | |
| 2003/0015248 | A1 | 1/2003 | Itoh | 139/420 R |
| 2003/0142933 | A1 | 7/2003 | Morris | 385/100 |
| 2004/0081411 | A1 | 4/2004 | Gladfelter et al. | 385/100 |
| 2005/0185902 | A1 | 8/2005 | James et al. | 385/100 |
| 2006/0016507 | A1 | 1/2006 | Baer | 139/383 R |
| 2006/0117807 | A1 | 6/2006 | Reiter | 66/196 |
| 2008/0054236 | A1 | 3/2008 | Morris | 254/134.4 |
| 2008/0264669 | A1 | 10/2008 | Bedingfield et al. | 174/97 |
| 2009/0218002 | A1 | 9/2009 | Kashihara | 139/433 |
| 2012/0073854 | A1 | 3/2012 | Allen | 174/68.1 |
| 2012/0132309 | A1 | 5/2012 | Morris | 138/115 |
| 2013/0105215 | A1* | 5/2013 | Morris | D04B 21/16 174/394 |
| 2017/0145603 | A1* | 5/2017 | Bedingfield | G02B 6/50 |
| 2019/0242271 | A1 | 1/2019 | Morris | |

FOREIGN PATENT DOCUMENTS

| | | | | |
|---|---|---|---|---|
| EP | 1 254 980 | 11/2002 | | |
| EP | 1 385 246 | 1/2004 | | |
| JP | 2005-116534 | 5/2006 | | |
| WO | WO 2004/020888 | 3/2004 | | |
| WO | WO 2008/027467 | 3/2008 | | |
| WO | WO 2008/070819 | 6/2008 | | |
| WO | WO 2010/015872 | 2/2010 | | |
| WO | WO-2010015872 A1 * | 2/2010 | | H02G 1/086 |

* cited by examiner

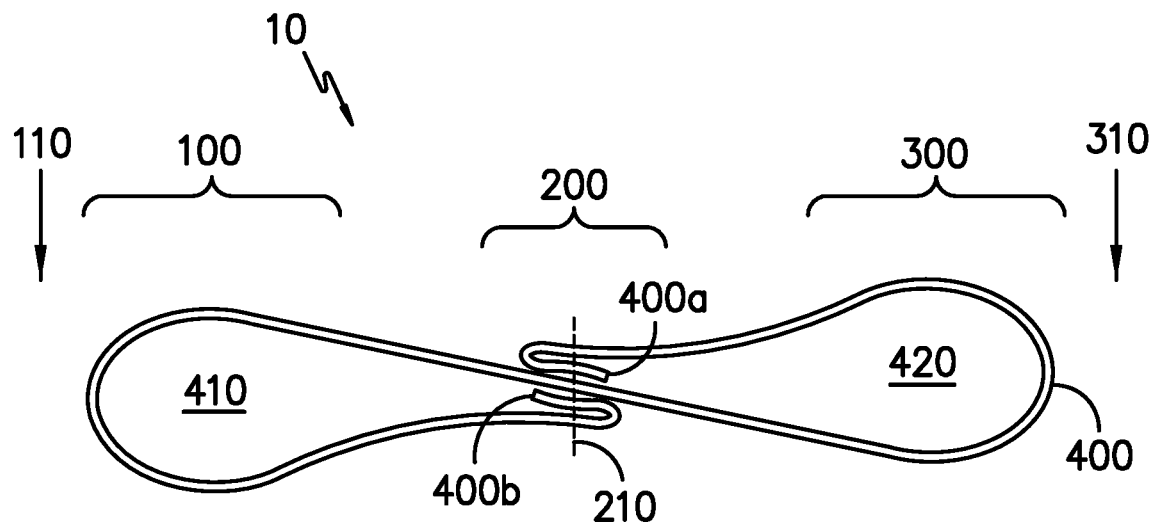
FIG. -1-
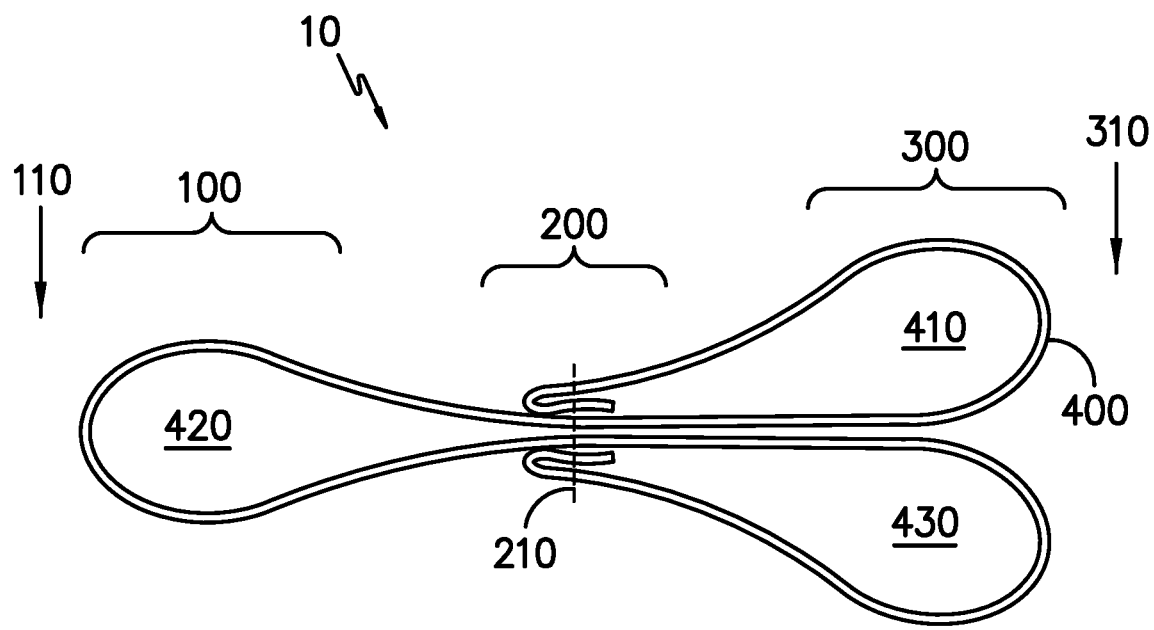
FIG. -2-

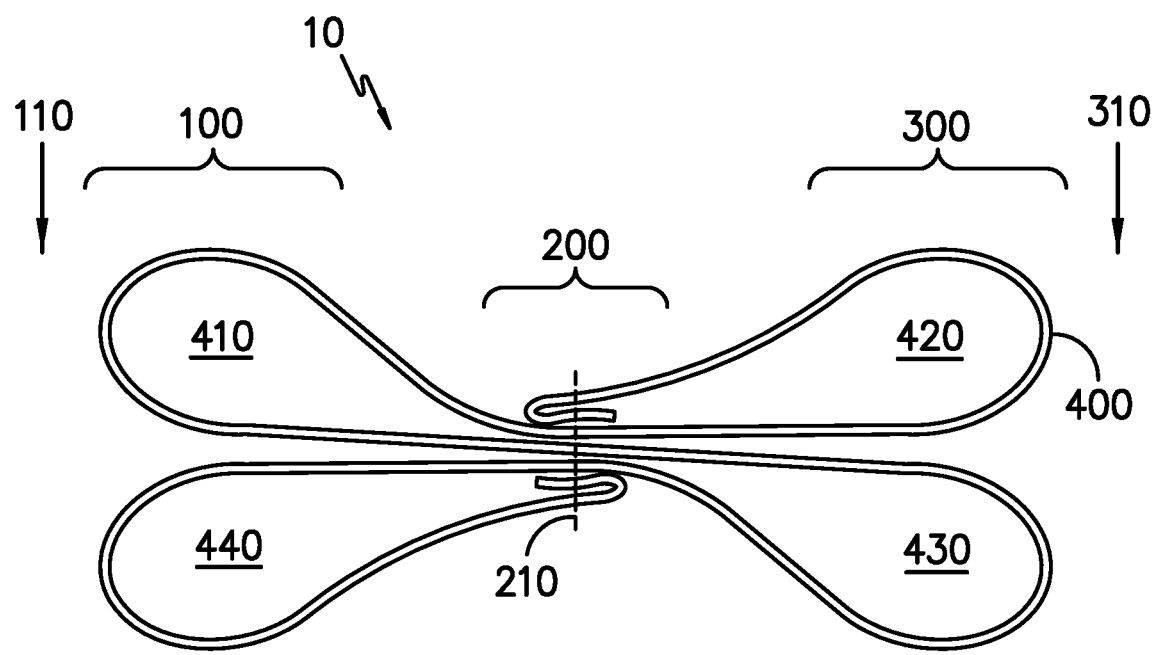
FIG. -3-
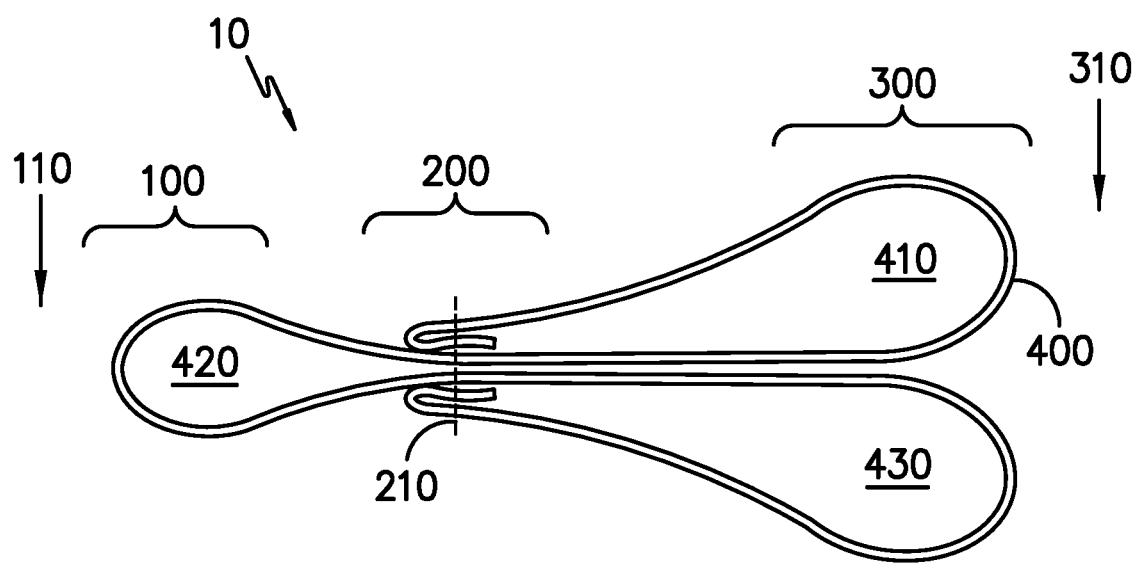
FIG. -4-

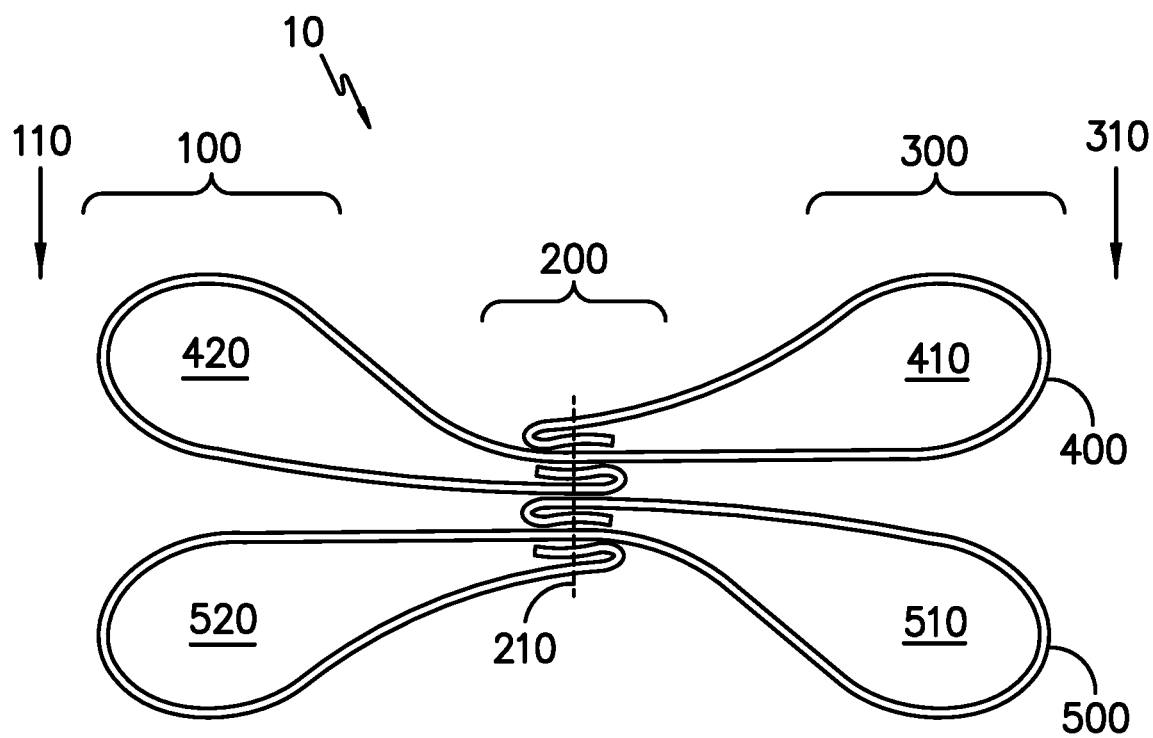
FIG. -5-
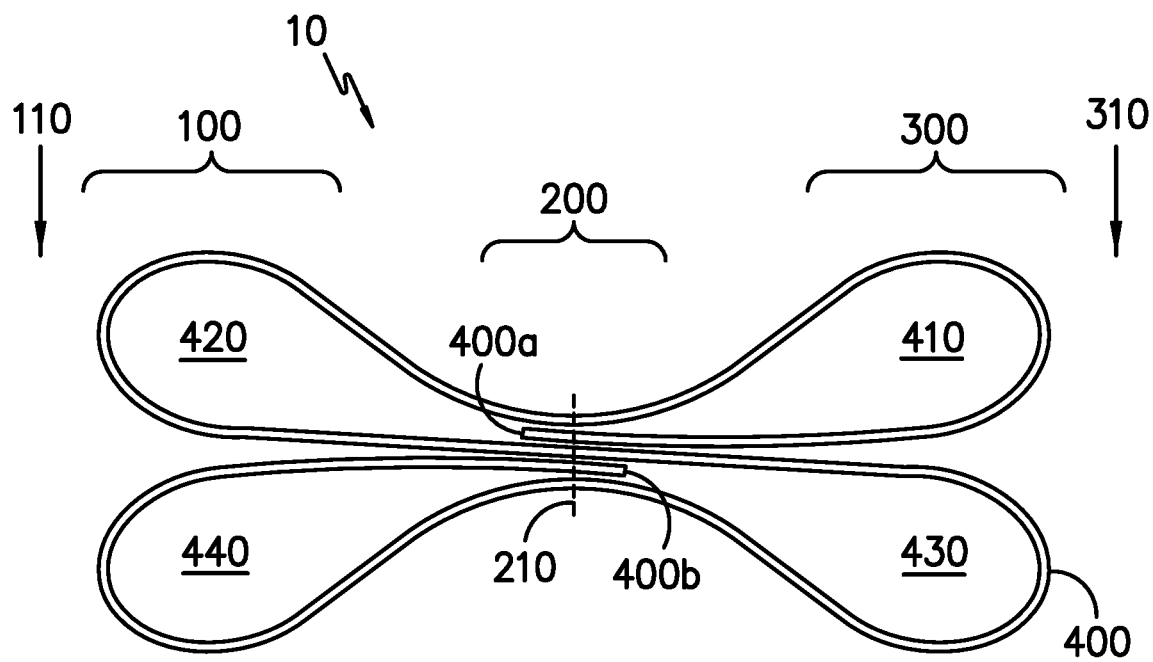
FIG. -6-

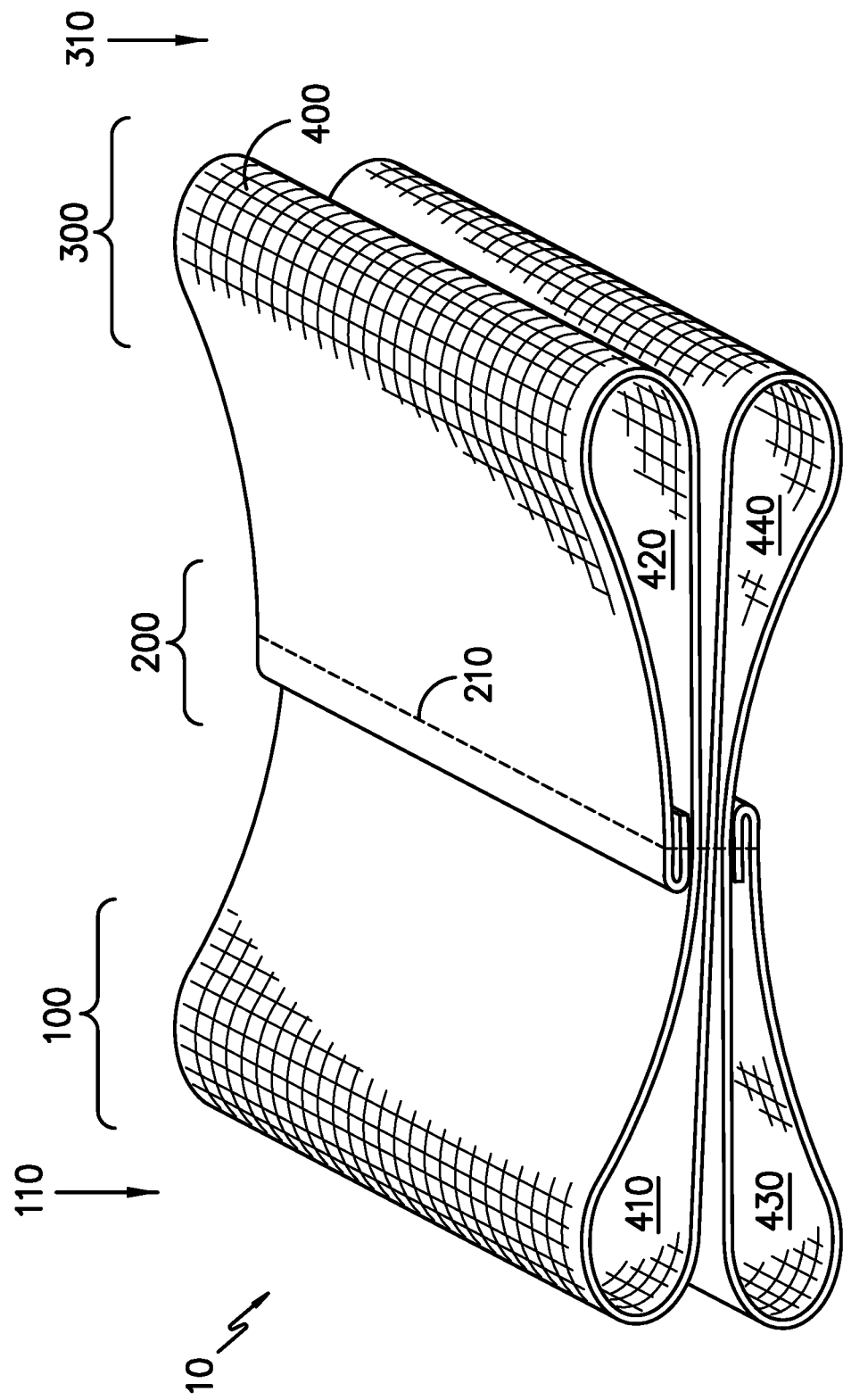
FIG. -7-

MULTIPLE CHAMBER FOLDED INNERDUCT STRUCTURE

RELATED APPLICATIONS

This application claims priority to U.S. provisional patent application 62/782,437, which is herein incorporated by reference in its entirety.

TECHNICAL FIELD

This invention relates generally to innerduct structures useful to position cables in conduit.

BACKGROUND

The use of a flexible innerduct structures within conduits serve multiple functions, including segregating individual cables into compartments or channels within the innerduct, to maximize the number of cables that may be positioned in a conduit, and facilitating insertion of cables into the conduit by preventing cable-against-cable friction and providing a tape or rope inside each compartment of the innerduct, for pulling the cable into the conduit.

Flexible innerduct structures made of textiles can have various shapes such as a "shared wall configuration", a "tear-drop configuration", and a tube. It would be desirable for an innerduct structure to minimize the amount of area taken up by seams in order to maximize the amount of usable space within small ducts.

BRIEF SUMMARY

A flexible innerduct structure having a first margin region, a second margin region, and a middle region, where the middle region is located between the first and second margin regions. The innerduct structure contains at least two flexible, longitudinal chambers, with each chamber being designed for enveloping at least one cable.

The flexible innerduct structure contains at least one strip-shaped textile, each strip-shaped textile containing a first side and a second edge and extending in the longitudinal direction. All first and second edges of the strips are located in the middle region and each strip-shaped textile extends outwards from the middle region, folds about a fold axis located in either the first margin region or second margin region and returns to the middle region forming a longitudinal chamber. At least one strip extends from the first margin region to the second margin region and the innerduct structure comprises at least one fold in at least one strip of the textile material in the first margin region and at least one fold in at least one strip of the textile material in the second margin region. The strips are attached together in the middle region.

BRIEF DESCRIPTION OF THE DRAWINGS

FIG. 1 is a cross-sectional illustrative view of an embodiment of the flexible innerduct structure containing two flexible longitudinal chambers.

FIGS. 2 and 4 are cross-sectional illustrative views of embodiments of the flexible innerduct structure containing three flexible longitudinal tubes.

FIGS. 3, 5, and 6 are cross-sectional illustrative views of embodiments of the flexible innerduct structure containing four flexible longitudinal tube.

FIG. 7 is a prospective view of one embodiment of the flexible innerduct structure containing four flexible longitudinal tubes.

DETAILED DESCRIPTION

Flexible innerduct structures have chambers and are used within conduits to help segregate individual cables into compartments or channels within the innerduct, to maximize the number of cables that may be positioned in a conduit, and to facilitate insertion of cables into the conduit by preventing cable-against-cable friction and providing a tape or rope inside each compartment of the innerduct.

The conduits that the innerduct structures are used in may be of any suitable size (inner or outer diameter), material, and length. Conduits may also be referred to as ducts, pipes, elongated cylindrical elements, and others.

To form more than one chamber in an innerduct structure, typically a seam is used to attach the layers together (this could be multiple pieces of textile, a textile folded onto itself, or a combination of both). This seam may be formed by any suitable means including sewing, gluing, or ultrasonics. The more chambers, typically the bulkier the seam and the less flexible it is. A larger or bulkier seam (or attachment) area is less of a concern with larger conduits and pipes but becomes more important in small conduits where the attachment takes up a greater portion of the available space within the conduit.

Referring to FIG. 1, there is shown one embodiment of the innerduct structure 10. The innerduct structure 10 contains three regions, a first margin region 100, a middle region 200, and a second margin region 300. In the structure 10 of FIG. 1, the structure 10 contains one striped-shaped textile 400 that forms two flexible longitudinal chambers 410, 420. Each of the chambers is designed for enveloping at least one cable.

Each strip-shaped textile 400 (500, 600, etc) has a first edge 400*a* and a second edge 400*b* (or 500*a*, 500*b*, respectively). The first and second edges 400*a*, 400*b* are located in the middle region 200 of the flexible innerduct structure 10. Each strip 400 extends outwards from the middle region 200 to either the first margin region 100 or the second margin region 300 and then returns to the middle region 200 forming the longitudinal chamber 410. The innerduct structure 10 may contain 2 or 3 or more strip-shaped textiles 400, 500 and at least one of those strip shaped textiles 400, 500 extends from the first margin region 100 to the second margin region 300. The innerduct structure contains at least one strip-shaped textile that contains both a fold in the first margin region 100 and a fold in the second margin region 200.

In the innerduct structure of FIG. 1, the structure 10 contains one strip-shaped textile 400 that forms two flexible chambers 410, 420. The first edge 400*a* of the strip-shaped textile 400 is in the middle region 200 of the structure 10, then extends outward into the second margin region 300, folds in the second margin region 300, extends over to the first margin region 100 (passing through the middle region 200), folds in the first margin region 100, and then returns to the middle region where the second edge 400*b* is located. The attachment means 210 in the middle region holds the strip-shaped textile together and in place.

Preferably, the width of the structure 10 (defined to be the distance between the first edge 110 and the second edge 310) is between about 20 and 40 mm, more preferably between about 21 and 39 mm. The width may also be larger or smaller than this range in order to fit a specific conduit.

Preferably, the distance between the attachment means 210 and the first edge 110 is between about 10 and 20 mm and the distance between the attachment means 210 and the second edge 310 is between about 10 and 20 mm.

In one preferred embodiment, all of the chambers are formed from a single strip-shaped textile such as shown in FIGS. 1-4, 6, and 7 as it is able to create the desired number of chambers with the fewest number of strip-shaped textile edges in the middle region of the structure 10.

In FIG. 3, the structure 10 contains one strip-shaped textile 400 that forms four longitudinal chambers 410, 420, 430, and 440. The first edge 400a of the strip-shaped textile 400 is located in the middle region 200 then the strip-shaped textile travels outward to the to the first or second margin region 100, 300, then to the other of the first or second margin region and repeats this pattern until 4 chambers are formed and the second edge 400b is located in the middle region. FIG. 7 is a illustrative view of the structure of FIG. 3.

The innerduct structure can have any suitable number of chambers, from two to four or more. The innerduct structure of FIG. 1 contains two chambers 410, 420 formed by one strip-shaped textile 400. The innerduct structures of FIGS. 2 and 4 contain 3 chambers 410, 410, 420. In these embodiments, the structure 10 is formed by 1 strip-shaped textile 400, but other embodiments were two of the chambers of formed with a first textile 400 and the third is formed by a second textile are also contemplated. The innerduct structures of FIGS. 3, 5, and 6 contain 4 chambers. The structure 10 of FIGS. 3 and 6 are made using a single strip-shaped textile 400 (creating chambers 410, 420, 430, 440) and the structure 10 of FIG. 5 is made using two strip-shaped textiles 400, 500 (creating chambers 410, 420, 510, 520). While not shown in the Figures, it is contemplated for the structure 10 to contain three or more strip-shaped textiles.

The number of folds in the strip-shaped textiles in the first and second margin region equals the number of chambers on that side of the attachment means. For example, if the textile 400 has one fold in the first margin region and two folds in the second margin region, then the structure will have one chamber on the first margin side of the attachment means and two chambers on the second margin side. This is shown, for example, in FIG. 2.

In some embodiments, the edge(s) of the strip-shaped textiles are folded over. This may be preferred to prevent the edges of the fabric getting caught on other materials during the manufacture, installation, and/or use of the innerduct structure 10 and also helps prevent the edge of the strip-shaped textile from coming loose from the attachment means 210. For example, the attachment means 210 may be a line of stitching and if there is some fraying of the edge of the strip-shaped textile, then some of the textile may come loose and one or more of the chambers may not be fully closed.

In some attachment means (such as ultrasonic welding), the fraying of the textile may be less likely to happen so having the edge folded over is less important. In another embodiment such as shown in FIG. 6, the strip-shaped textile may be oriented such that the edges 400a, 400b of the strip-shaped textile 400 are located between other folded layers of the textile 400 and so are not located on the top or bottom surface of the structure 10.

Preferably, the textile(s) are only attached together and to themselves at the attachment means 210 and are not attached in the first margin region 100, second margin region 300, first edge 110, or second edge 310. This allows the chambers to spread and better fill the conduit. In the structure shown in FIGS. 3 and 5-7, when installed into a conduit the chambers of the structure 10 spread to fill the conduit and have a dragonfly or butterfly like appearance in cross-section.

In one embodiment, the attachment means 210 is in the center of the middle region, defined to be approximately equidistant from the two edges of the structure. This is preferred to create chambers with all approximately the same size. In another embodiment, the attachment means 210 is off-center, meaning that it is not in the center of the structure. This creates chambers in one of the margin regions to be larger than the chambers in the other margin region. This may be preferred to accommodate wires, cables, pull tapes, etc of varying sizes. This is shown, for example, in FIG. 4. In another embodiment, the innerduct 10 contains at least one chamber in the first margin and/or second margin that is a different size than the other chambers on that same margin region. For example, chambers 420 and 430 of FIG. 3 may be different sizes.

The attachment means 210 may be any suitable way of attachment. In one preferred embodiment, the attachment means 210 is a sewn seam made by sewing the layers of textile together. Other methods of forming the attachment include stapling or riveting the textiles at intervals along the length, ultrasonic welding, or fastening the fabric with a hot melt or solvent based adhesive. The textiles may also be provided with relatively low temperature melting fibers, which can be melted and allowed to cool, thereby fusing the structure together at the attachment.

Creating chambers from a strip-shaped textile material instead of as a seamless tube (using circular weaving or knitting for example) has many benefits. The first benefit is around splicing. It is much easier to splice a flat strip-shaped textile materials together to create longer lengths then fold the strips into chambers than it is to splice together seamless tubes. Secondly, different sized chambers and structures 10 can be manufactured more easily with less machine downtime. Simply slitting the strip-shaped textile materials to different widths before folding them into the structure can create structures and chambers with different diameters. For many seamless tube manufacturing processes, the setup of warps and/or weft would have to be redone in order to change the diameter (and therefore the size) of the tube being produced.

The strip-shaped textile(s) may be made from any suitable fabric material including, but not limited to, woven, knit, and nonwoven textiles. For embodiments using more than one strip-shaped textile, all of the textiles within the structure may be the same or different textiles can be used together in the structure.

The terms "pick," "picks," "picks per inch" and "ppi" are intended to refer to (a) one filling yarn carried through a shed formed during the weaving process and interlaced with the warp yarns; and (b) two or more filling yarns carried through a shed during the weaving process, either separately or together, and interlaced with the warp yarns. Thus, for the purposes of determining the picks per inch of a woven textile, multiple-inserted filling yarns are counted as a single pick.

The terms "multiple-insertion" and "double-insertion" are intended to include (a) multiple filling yarns inserted in the shed of the loom together; (b) multiple filling yarns inserted separately, while the shed of the loom remains the same; and (c) multiple filling yarns inserted separately, where the shed of the looms remains substantially the same, that is, the position of 25% or less of the warp yarns are changed between insertions of the yarns.

In one embodiment, the strip-shaped textile is preferably a plain weave, although other constructions, such as twill or satin weaves, are within the scope of the invention. The individual warp yarns ("ends") are selected to provide high tenacity and low elongation at peak tensile load. By way of example, the warp yarns may be selected from polyesters, polyolefins, such as polypropylene, polyethylene and ethylene-propylene copolymers, and polyamides, such as nylon and aramid, e.g. Kevlar®. Yarns having a peak elongation at peak tensile load of 45% or less, preferably 30% or less, may be used. Monofilament yarns, including bi- and multi-component yarns, have been found to be particularly useful in innerduct applications. Multifilament yarns may also be used in the warp. Warp yarns having a denier of from 350 to 1,200, preferably 400 to 750, may be employed. The end count (yarns per inch in the warp) may range from 25 to 75 ends per inch, preferably from 35 to 65 ends per inch. In one embodiment of the invention a plain weave textile having 35 to 65 ends per inch of 400 to 750 denier monofilament polyester warp yarns is provided. Preferably, the warp yarns comprise monofilament yarns, more preferably all of the warp yarns are monofilament yarns. Preferably, the warp yarns comprise polyester as polyester has been shown to create good cost and performance yarns.

By selecting warp yarns having a relatively low elongation at peak tensile load, it is possible to minimize lengthwise elongation of the innerduct structure during installation of the innerduct in a conduit, thereby avoiding "bunching" of the innerduct. Additionally, the elongation potential in the warp direction of the textile incorporated into an innerduct can be minimized by reducing the warp crimp during the weaving process. For example, the warp crimp may be reduced by increasing the tension on the warp yarns during weaving to achieve a warp crimp of less than 5%, as measured by ASTM D3883—Standard Test Method for Yarn Crimp and Yarn Take-Up in Woven Fabrics. Reducing the warp crimp in the fabric, especially a plain weave fabric, results in an increase in the crimp of the filling yarn, which has the further advantage of increasing the seam strength along the longitudinal edges of the sections of fabric used to construct the innerduct.

Preferably, the fill yarns comprise monofilament yarns, preferably monofilament nylon yarns. In one embodiment, at least a portion of the filling yarns are multiple-inserted multifilament yarns in the woven textile. In various embodiments of the invention, the woven textile may be constructed with at least one-fourth of the picks being multiple-inserted multifilament yarns, at least one-third of the picks being multiple-inserted multifilament yarns, or even at least one-half of the picks being multiple-inserted multifilament yarns. Strip-shaped textile in which the multiple-inserted multifilament yarns are double-inserted have been found to be particularly useful for making innerduct structures.

In one embodiment, at least a portion of the filling yarns are multiple-inserted multifilament yarns. Each multifilament yarn is made of continuous filaments of a synthetic polymer. By way of example, the yarns may be selected from polyesters, polyolefins, such as polypropylene, polyethylene and ethylene-propylene copolymers, and polyamides, such as nylon and aramid. Each yarn may contain from 30 to 110 individual filaments, typically from 50 to 90 individual filaments, and the denier of the yarn may range from 200 to 1,000, typically from 500 to 800. Each multifilament yarn may be constructed of one, two or more plies. The multiple-inserted multifilament yarns may be inserted in the shed of the loom individually or together.

The multifilament yarns may be textured yarns, that is, yarns which have been treated to provide surface texture, bulk, stretch and/or warmth. Texturing may be accomplished by any suitable method, as is known to those skilled in the art. Of particular interest are textured polyester yarns. By way of example, the polyester may be polyethylene terephthalate. Other examples of suitable polyester polymers for use in fiber production may be found in U.S. Pat. No. 6,395,386 B2.

In one embodiment of the invention, the fill yarns are provided in an alternating arrangement of monofilament yarns and multifilament yarns, as disclosed in US Patent Application No. 2008/0264669 A1. The phrase "alternating arrangement" refers to a repeating pattern of picks of monofilament to multifilament yarns. By way of example, the arrangement of monofilament to multifilament yarns may be 1:1, 1:2, 1:3, 2:3, 3:4, or 3:5. It can be understood that some or all of the multifilament yarn picks may be multiple-inserted multifilament yarns.

Bi- or multi-component yarns of various configurations are intended to be included within the definition of monofilament yarns used in the alternating pattern in the filling direction of the fabric.

When monofilament yarns are included in the filling direction of the textile, the monofilament filling yarns may be selected from polyesters, polyolefins, such as polypropylene, polyethylene and ethylene-propylene copolymers, and polyamides, such as nylon, particularly nylon 6, and aramid. Monofilament filling yarns having a denier of from 200 to 850, preferably 300 to 750, may be employed. In one embodiment of the invention, two different size monofilament yarns are incorporated into the alternating pattern in the filling direction. For example, one of the monofilament filling yarns may have a denier of less than 435 and the other monofilament filling yarn may have a denier greater than 435.

The pick count (picks per inch in the filling) may range from 12 to 28 picks per inch. One of the advantages of the present invention is that it is possible to provide a fabric at the lower end of the pick count range, in order to reduce filling rigidity and reduce material and manufacturing costs. Accordingly, strip-shaped textiles having a pick count in the range of 12 to 22 picks per inch are preferred. In one embodiment of the invention a plain weave having from 14 to 22 picks per inch of an alternating pattern of nylon monofilament and double-inserted textured polyester monofilament is provided.

In one embodiment, the strip-shaped textile may have a weave pattern that contains different repeating zones having different weave patterns such as plain, weaves with multiple insertions, and zones with floating yarns. In one embodiment, the strip-shaped textile contains alternating pattern containing first weave zones and partial float weave zones and contains a plurality warp yarns arranged into groupings of warp yarns, wherein each grouping contains between 2 and 10 warp yarns and a plurality of picks of weft yarns. In each first weave zone, the picks of weft yarns comprise a repeating first weft pattern of at least one monofilament yarn, at least one multiple-inserted multifilament yarn, and optionally at least one single-inserted multifilament yarn. In each partial float zone, the picks of weft yarns within the partial float weave zone comprise a repeating second weft pattern of at least one monofilament yarn, at least one multiple-inserted multifilament yarn, and optionally at least one single-inserted multifilament yarn. Only a portion of the warp yarns within at least a portion of the warp groupings float over 3 weft yarns including floating over at least one multiple-inserted multifilament weft yarn in at least a portion of weft pattern repeats, and wherein outside of the floats the non-floating warp yarns pass successively over and under alternating picks of weft yarns. Such a textile is described in US Patent Application Publication 2017/0145603 which is herein incorporated by reference.

The strip-shaped textile may be made as a flat sheet in a conventional weaving machine or in a circular weaving machine and then slit. A traditional weaving machine is typically a faster manufacturing process and multiple diameter strip-shaped textiles can be formed from one manufacturing line (the textile sheet just needs to be slit at different widths).

To draw the fiber optic, coaxial, or other cables through the innerduct structure, it is desirable to provide pull lines for such purpose. The pull lines are positioned within the compartments of the innerduct, preferably before installation of the innerduct within the conduit. By way of example, the pull lines may be tightly woven, relatively flat strips of material or may be a twisted ropes or multi-ply cords having a substantially round cross-section.

Preferably, the innerduct and the pull line have respective values of elongation percentage which are substantially equal for a given tensile load. If elongation of the innerduct differs substantially from that of a pull line, one of those structures may lag relative to the other when they are pulled together through a conduit during installation, resulting in bunching of the innerduct. The pull lines may be formed of tightly woven, polyester material, which exhibits a tensile strength of between about 400 pounds and about 3,000 pounds.

Generally, a conduit is a rigid or semi-rigid piping or duct system for protecting and routing cables, electrical wiring and the like. The term "cable" is intended to include fiber optic cables, electrical wires, coaxial and triaxial cables, as well as any other line for transmitting electricity and/or electromagnetic signals. By way of example, the conduit may be made of metal, synthetic polymer, such as thermoplastic polymer, clay or concrete. The passageway through the conduit may have a round, oval, rectangular or polygonal cross-section. The present invention finds utility in combination with virtually any conduit system. Depending upon the relative size of the passageway in the innerduct, typically calculated as the inside diameter, persons skilled in the art may select from the width of the innerduct, number of compartments in each innerduct, and number of individual innerducts, to maximize the capacity of the conduit.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flexible innerduct structure having a first margin region, a second margin region, and a middle region, wherein the middle region is located between the first and second margin regions, wherein the innerduct structure comprises at least two flexible, longitudinal chambers, each chamber designed for enveloping at least one cable, wherein the flexible innerduct structure comprises:

at least one strip-shaped textile, wherein each strip-shaped textile comprises a first edge and a second edge and extends in the longitudinal direction, wherein all first and second edges of the strips are located in the middle region, wherein each strip-shaped textile extends outwards from the middle region, folds about a fold axis located in either the first margin region or second margin region and returns to the middle region forming a longitudinal chamber, wherein at least one strip extends from the first margin region to the second margin region, wherein the innerduct structure comprises at least one fold in at least one strip of the textile material in the first margin region and at least one fold in at least one strip of the textile material in the second margin region, wherein the strips are attached together in the middle region, and wherein the strips are attached together in the middle section by sewing.

2. The flexible innerduct structure of claim 1, wherein all the chambers are formed from a single, continuous strip-shaped textile.

3. The flexible innerduct structure of claim 1, wherein the innerduct structure comprises at least two strips of textile material.

4. The flexible innerduct structure of claim 1, wherein the innerduct structure comprises at least three chambers.

5. The flexible innerduct structure of claim 1, wherein the innerduct structure comprises at least four chambers.

6. The flexible innerduct structure of claim 1, wherein at least the first edge of the textile material is folded onto itself in the middle region.

7. The flexible innerduct structure of claim 6, wherein the first edge and the second edge are folded onto themselves in the middle region.

8. The flexible innerduct structure of claim 1, wherein the innerduct structure comprises at least two folds in the textile material in the first margin region and at least one fold in the textile material in the second margin region.

9. The flexible innerduct structure of claim 1, wherein the innerduct structure comprises at least one fold in the textile material in the first margin region and at least two folds in the textile material in the second margin region.

10. The flexible innerduct structure of claim 1, wherein the innerduct structure comprises two folds in the textile material in the first margin region and two folds in the textile material in the second margin region.

11. The flexible innerduct structure of claim 1, wherein the distance between the middle region to the first margin region is greater than the distance between the middle region and the second margin region.

12. The flexible innerduct structure of claim 1, wherein the innerduct chambers are only joined together in the middle region.

13. The flexible innerduct structure of claim 1, further including a cable in at least one of the innerduct chambers.

14. The flexible innerduct structure of claim 1, further including a pull line in at least one of the innerduct chambers.

15. The flexible innerduct structure of claim 1, wherein the textile material comprises warp yarns in the longitudinal direction of the flexible innerduct and fill yarns in the transverse direction of the flexible innerduct.

16. The flexible innerduct structure of claim 1, wherein the warp yarns comprise monofilament yarns.

17. The flexible innerduct structure of claim 1, wherein the fill yarns comprise monofilament yarns.

18. The flexible innerduct structure of claim 17, wherein the fill yarns further comprise multifilament yarns.

19. The flexible innerduct structure of claim 1, wherein the textile material is a woven fabric comprising:

(a) a warp comprised of monofilament yarn ends; and
(b) a filling comprised of a combination of monofilament and multifilament yarn picks, wherein at least a portion of the multifilament yarn picks are multiple-inserted.

20. The flexible innerduct structure of claim 1, wherein the textile material is a woven fabric comprising:
- a plurality warp yarns arranged into groupings of warp yarns, wherein each grouping contains between 2 and 10 warp yarns; and,
- a plurality of picks of weft yarns;
- wherein in each first weave zone the picks of weft yarns comprise a repeating first weft pattern of at least one monofilament yarn, at least one multiple-inserted multifilament yarn, and optionally at least one single-inserted multifilament yarn,
- wherein in each partial float zone the picks of weft yarns within the partial float weave zone comprise a repeating second weft pattern of at least one monofilament yarn, at least one multiple-inserted multifilament yarn, and optionally at least one single-inserted multifilament yarn,
- wherein only a portion of the warp yarns within at least a portion of the warp groupings float over 3 weft yarns including floating over at least one multiple-inserted multifilament weft yarn in at least a portion of weft pattern repeats, and wherein outside of the floats the non-floating warp yarns pass successively over and under alternating picks of weft yarns.

21. A conduit comprising one or more of the flexible innerduct structure of claim 1.

* * * * *